United States Patent Office 2,728,784
Patented Dec. 27, 1955

2,728,784

STABILIZATION OF OXIDIZABLE MATERIALS AND STABILIZERS THEREFOR

Alan Bell, Clarence E. Tholstrup, and Gerald R. Lappin, Kingsport, Tenn., assignors to Eastman Kodak Company, Rochester, N. Y., a corporation of New Jersey No Drawing. Application March 17, 1954, Serial No. 416,956

6 Claims. (Cl. 260—398.5)

This invention relates to the stabilization of materials normally subject to oxidation, such as fats and oils, and to certain new antioxidants for use in stabilizing such materials.

As is well known, fats, oils, hydrocarbons, and similar oxidizable materials are normally subject to the deleterious effects of oxidation unless a suitable stabilizer material is incorporated therein. A large number of materials have been proposed for use as stabilizers in these and similar materials, including hydroxy benzene derivatives such as the well known hydroquinone. It has been difficult to predict, however, whether any particular class of materials will or will not stabilize such oxidizable materials against the objectionable effects of oxidation such as the development of rancidity. Thus, for example, although hydroquinone itself is an effective stabilizer and has been widely used, many of the derivatives of hydroquinone have proven to have little or no activity as antioxidants.

It is accordingly an object of this invention to provide a new class of stabilizers which are highly effective in obviating objectionable oxidation in such normally oxidizable materials as fats, oils and the like.

Another object of the invention is to provide compositions of matter consisting predominantly of material normally subject to oxidation and containing a stabilizing amount of a new antioxidant which is effective to reduce the oxidation to an unobjectionable level.

Another object of the invention is to provide a new class of antioxidants which are particularly effective for protecting fats, oils and similar organic compositions from oxidative deterioration.

Other objects will be apparent from the description and claims which follow.

These and other objects are attained by means of this invention, which comprises stabilizing materials normally subject to rapid oxidative deterioration by incorporating therein a small amount of a hydroxyphenylpropenone as described more fully hereinafter. The stabilizer compounds which embody this invention are 3,4-dihydroxyphenylpropenones of the formula

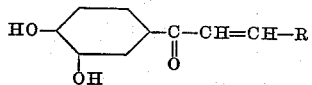

or

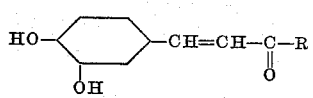

in which R is either hydrogen or an alkyl, aryl, or substituted aryl group. The compounds which are preferably employed in practicing the invention are those in which R is either a phenyl group, a hydroxy substituted phenyl group, or a lower alkyl group containing from 1 to 4 carbon atoms. If desired, however, R can be a higher alkyl group containing from 4 to 22 carbon atoms within the scope of this invention.

Either of the 3,4-dihydroxyphenylpropenones as set out in the formulas above can be employed, although the compounds of the formula

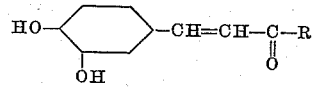

are preferred since they have the highest stabilizing activity. The compounds of the formula

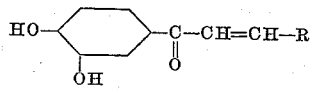

are entirely suitable for use in practicing the invention, however, since as is shown hereinafter, such compounds have as high antioxidant activity as the well known antioxidant butylated hydroxy anisole. The antioxidants embodying this invention can be readily prepared by the reaction between an appropriate aldehyde and a ketone in the presence of aqueous-alcoholic potassium hydroxide, in accordance with known procedures for preparing chalcones and similar phenones.

The high degree of activity of the antioxidants of this invention is particularly surprising since the isomeric 2,5-dihydroxypropenones which can be readily prepared from hydroquinone are almost totally ineffective for use in stabilizing such materials as fats and oils against oxidation. In contrast to this, the hydroxyphenylpropenones of this invention having the hydroxyl substituents in the 3- and 4-positions are highly effective in stabilizing oxidizable materials employing relatively low concentrations of the antioxidant of the order of from about 0.001 to 1.0% by weight based on the weight of the composition being stabilized. Larger amounts of the stabilizers can be employed if desired, although such larger amounts are usually not necessary.

The antioxidants of this invention are typified by, but not limited to, such 3,4-dihydroxyphenylpropenones as 3',4'-dihydroxy chalcone of the formula

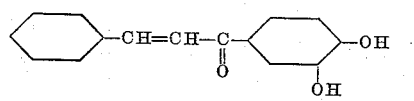

3,4-dihydroxy chalcone of the formula

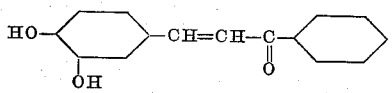

and similar 3,4-dihydroxyphenylpropenones having a phenyl group as the group R in the formulas set out above; 3,4-dihydroxyphenyl alkenones such as 1-(3,4-dihydroxyphenyl)-1-buten-3-one of the formula

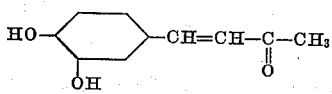

and similar materials wherein the group R is an alkyl group such as a methyl, ethyl, propyl, butyl, or higher alkyl group; and propenones in which R is a hydroxyphenyl group such as 2',3,4-trihydroxy chalcone of the formula

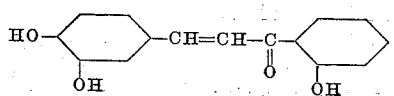

The unexpected nature of the invention is apparent when it is considered that the 2′,5′-dihydroxy chalcone of the formula

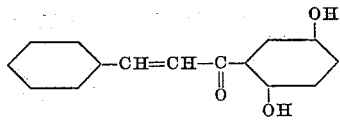

is almost completely ineffective for stabilizing fats and oils.

The following table shows the utility of compounds embodying this invention in stabilizing lard as a substrate. The materials embodying the invention are compared to a control sample containing no stabilizer, a sample of lard containing an equal amount of butylated hydroxy anisole, and a sample containing 2′,5′-dihydroxy chalcone. In each case, except the control, the lard substrate contained 0.02% by weight of the additive based on the weight of lard. The stabilization was tested by means of the Active Oxygen Method (A. O. M.), wherein the sample was heated at 99° C. with a stream of air bubbling through the sample, and the time to reach a peroxide content of 20 milliequivalents per kilogram was checked. These values are set out in the column headed A. O. M. In order to give an indication of the relative effectiveness of the stabilizers embodying this invention, the column headed A. I. (Antioxidant Index) gives a comparison of these materials with butylated hydroxy anisole.

Table

| Antioxidant | A. O. M., hour | A. I. |
|---|---|---|
| Control | 13.0 | |
| 2′,5′-dihydroxychalcone | 15.0 | 0.14 |
| Butylated Hydroxy Anisole | 27.0 | 1.0 |
| 3′,4′-dihydroxychalcone | 31.0 | 1.3 |
| 1-(3,4-dihydroxyphenyl-1-buten-3-one | 70.0 | 4.1 |
| 2′,3,4-trihydroxychalcone | 57.0 | 2.0 |
| 3,4-dihydroxychalcone | 57.0 | 2.0 |

As can be seen from the data set out in the table, the 2,5-dihydroxychalcone which is an isomer of the materials embodying this invention is almost totally ineffective for use in stabilizing lard. In contrast to this, the stabilizers of this invention have activities of at least two, and as much as four times that of butylated hydroxy anisole which is widely used in the stabilization of fats and oils. The compounds described herein and used in accordance with our invention can be employed for the stabilization of any oxidizable organic compounds which are subject to deterioration, as for example carotene, mineral oils, vegetable oils, and other well known oxidizable materials.

The stabilizers of this invention are readily incorporated into such materials as lard, cottonseed oil, peanut oil, paraffin, and the like, by admixing the stabilizer with the material to be stabilized, whereby a solution of the antioxidant and the substrate is usually obtained. Alternatively, the stabilizer can be dissolved in a suitable solvent which is inert to both the antioxidant and the other components of the composition being stabilized. Suitable solvents include glycerin, propylene glycol, hexane, and the like, and the resulting antioxidant solutions can be readily dissolved in the fat or oil or other material to be stabilized without the necessity for prolonged mixing of the composition. If desired, the stabilizers embodying this invention can be employed singly or in mixtures of two or more of such stabilizers, as well as mixtures with other well known antioxidants with or without the addition of synergists such as citric acid, tartaric acid, phosphoric acid, ascorbic acid, propyl gallate, and the like.

Among the materials which can be stabilized by means of this invention are the animal fats and vegetable oils, whether hydrogenated or unhydrogenated, and including such representative fats and oils as linseed oil, menhaden oil, cod liver oil, castor oil, olive oil, cocoanut oil, palm oil, corn oil, sesame oil, peanut oil, babassu oil, butter fat, lard, beef tallow, and the like, as well as hydrogenated fats and oils prepared from these and similar materials. Various other fats and oils may be similarly treated within the scope of the invention. In addition, the stabilizers of this invention can be employed to stabilize hydrocarbon fuels, plastic compositions, mineral oils, paraffin, and the like.

The stabilized compositions provided by this invention desirably contain from about 0.001% to about 1.0% by weight of the antioxidant embodying the invention. The invention also includes combinations of such new antioxidants with other well known antioxidants such as butylated hydroxy anisole, propyl gallate, tocopherol, and similar antioxidant materials. When a synergist is employed in conjunction with the antioxidant, such a synergist is desirably employed in an amount of from about 0.0005% to about 0.1% by weight based on the weight of the material being stabilized.

The blending of the stabilizing material with the oxidizable material can be carried out in any well known manner, and the stabilized compositions thereby obtained are protected against oxidative deterioration for a period many times longer than the normal period necessary for the development of rancidity or other objectionable oxidation effects.

Although the invention has been described in considerable detail with particular reference to certain preferred embodiments thereof, variations and modifications can be effected within the spirit and scope of the invention as described hereinabove and as defined in the appended claims.

We claim:

1. A composition of matter comprising a major proportion of fatty material normally subject to oxidation and a minor proportion effective to stabilize said fatty material of a 3,4-dihydroxyphenylpropenone selected from the group consisting of compounds of the formula

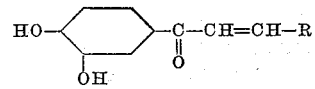

and compounds of the formula

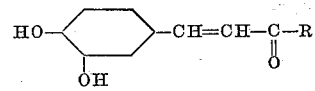

wherein R is a member of the group consisting of hydrogen, alkyl groups, phenyl groups, and hydroxyphenyl groups.

2. A composition of matter comprising a fatty material normally subject to oxidation stabilized with a 3,4-dihydroxyphenylpropenone of the formula

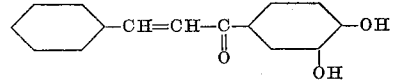

3. A composition of matter comprising fatty material normally subject to oxidation stabilized with a 1-(3,4-dihydroxyphenyl)-1-alken-3-one.

4. A composition of matter comprising oxidizable fatty material stabilized with a material of the formula

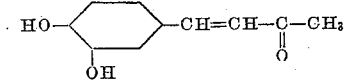

5. A composition of matter comprising oxidizable fatty material stabilized with a compound of the formula
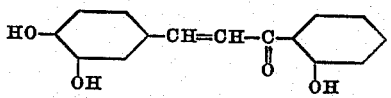
6. A composition of matter comprising oxidizable fatty material stabilized with a compound of the formula
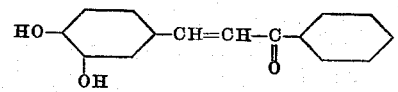
References Cited in the file of this patent
Chemical Abstract 46, 10421d.